Figure 2:
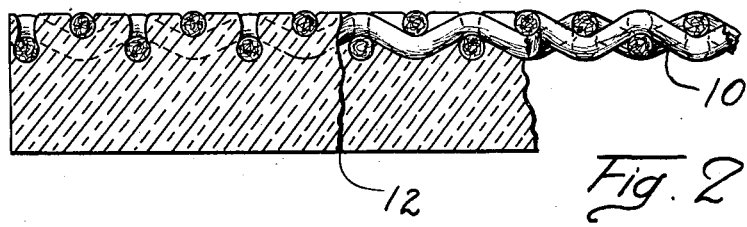

March 27, 1934.  A. J. SMITH  1,952,468
AUTOMOBILE TRIM MATERIAL AND ITS METHOD OF MANUFACTURE
Filed Oct. 15, 1931    2 Sheets-Sheet 1

INVENTOR.
Alfred J. Smith
BY
ATTORNEYS

March 27, 1934. A. J. SMITH 1,952,468
AUTOMOBILE TRIM MATERIAL AND ITS METHOD OF MANUFACTURE
Filed Oct. 15, 1931    2 Sheets-Sheet 2
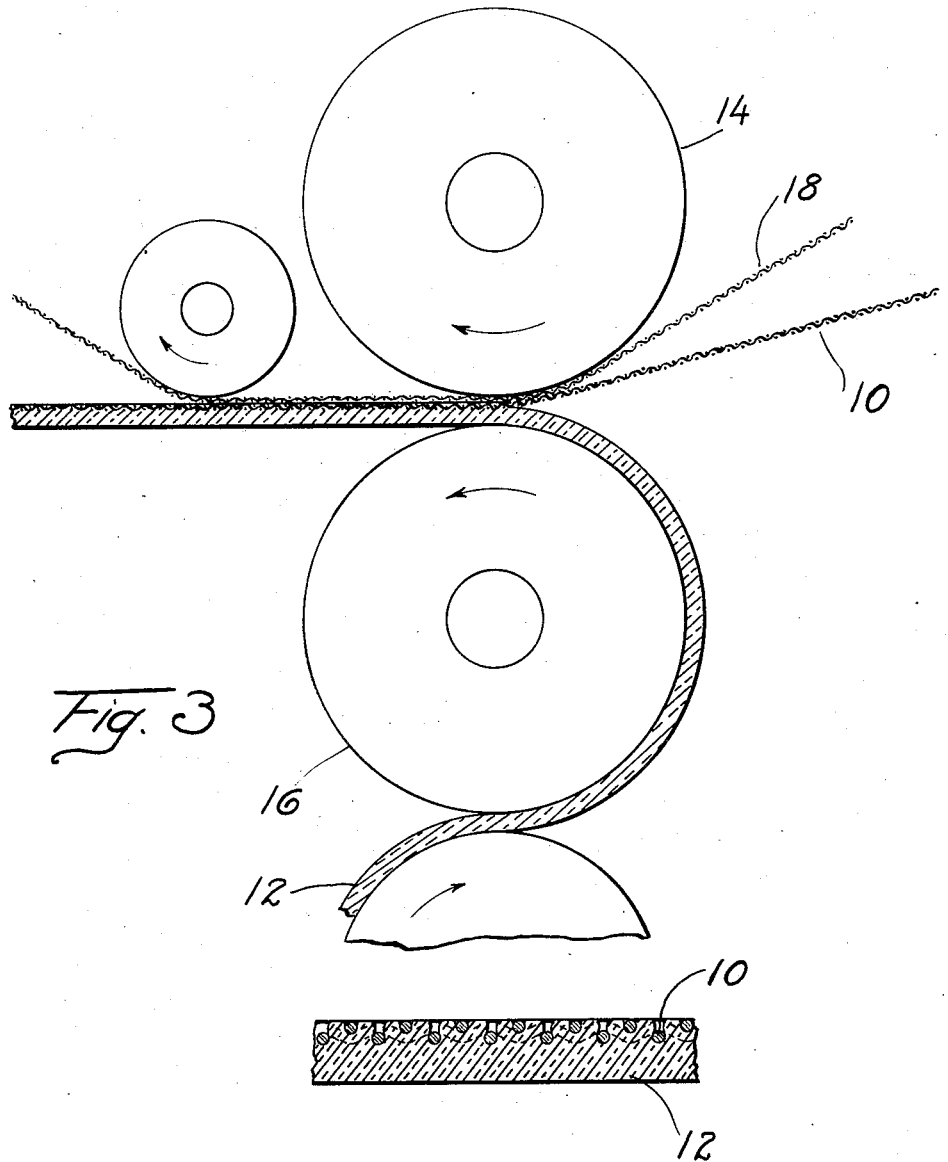
INVENTOR.
Alfred J. Smith
BY
ATTORNEYS.

Patented Mar. 27, 1934

1,952,468

UNITED STATES PATENT OFFICE 1,952,468

AUTOMOBILE TRIM MATERIAL AND ITS METHOD OF MANUFACTURE

Alfred J. Smith, Detroit, Mich.

Application October 15, 1931, Serial No. 569,009

4 Claims. (Cl. 154—2)

My invention relates to improvements in automobile trim or upholstery material such as used in automobile sport tops, and to improvements in the method of manufacturing such material.

An object of my invention is to provide a new and improved material of the character described, though it is to be understood that my invention is applicable to other similar materials, wherever such materials may be used and to an improved method of making the same.

An object is the provision of material suitable for such uses which is strong, flexible, durable, substantially non-shrinkable, and waterproof; which is capable of being easily cleaned; which possesses an attractive appearance; and which is adaptable for manufacture in a variety of pleasing forms and color combinations.

An important feature of my material is that it is weatherproof and waterproof and is capable of retaining its serviceability and attractive appearance notwithstanding exposure under varying weather conditions and for long periods of time.

Although my improved material is primarily intended for automobile, or rather vehicle use, and mainly as a sport top material, it is adaptable for many other uses and it is usable wherever an attractive weatherproof material is desired and wherever it is necessary that the serviceability and attractive appearance be combined in the same material and that the material be of such a character that it will stand exposure without losing either serviceability or attractive appearance.

In the provision of such a flexible waterproof material I employ a relatively loosely woven fabric, the appearance and color of which are desired for the outer surface of my improved material, and I use therewith a waterproof plastic compound such as rubber, which is integrated with the fabric so as to fill the interstices of the fabric and which terminates flush with the fabric on one side to form a substantially smooth and unbroken surface. The rubber compound extends substantially beyond the opposite surface of the fabric and forms a substantial body for the material itself.

An important feature of my process is that the integration of the fabric and rubber is so accomplished that while the threads of the fabric are completely sealed and locked in place and thereby protected, the weave and color of fabric is so exposed as to present its attractive natural appearance.

Figure 1:
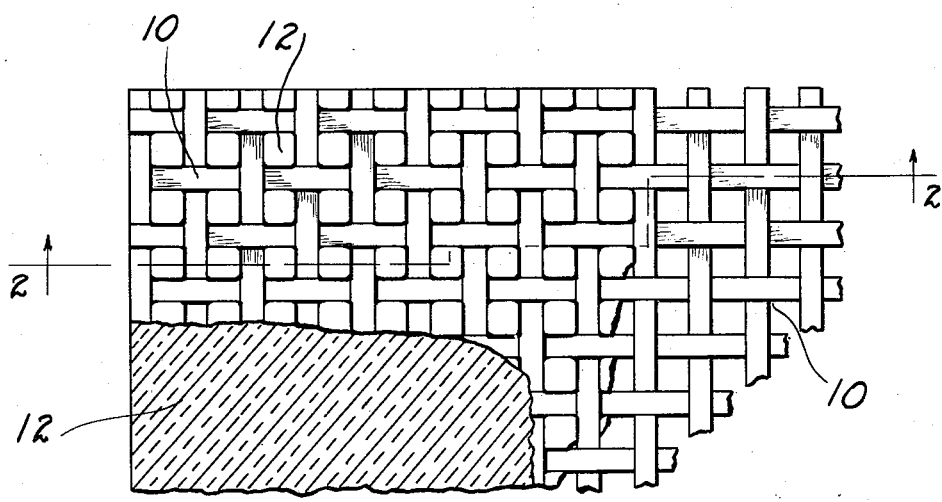

The above objects and others together with other important features and characteristics will more fully appear from the following description, appended claims, and accompanying drawings, wherein:

Fig. 1 is a plan of a piece of material embodying my invention being partly broken away to expose the construction, Fig. 2 is an enlarged cross sectional view designed to show the character of the interconnection of the rubber compound with the fabric, Fig. 3 is a diagrammatic view showing my improved process of manufacture, and Fig. 4 is a cross sectional view showing a sheet of the completed material.

Heretofore sport top material has been manufactured either as a closely woven fabric, rubber coated, embossed, and varnished, or as a multiple ply structure wherein the separate plies were adhesively secured together by a suitable waterproof compound. Both of these types of material possessed inherent disadvantages which rendered their use unsuitable for one reason or another. The first type of material was commercially available only in black color, as rubber compound in other colors tends to deteriorate, and furthermore the material possessed an appearance which was limited by that appearance which could be imparted to a sheet of rubber.

The second type of material is characterized by the fact that the fabric sheets were exposed and for this reason were very difficult to keep clean. Dirt and other foul material tended to collect in the fabric and it was difficult to remove the same. This second type of material has, notwithstanding these disadvantages, been widely used and has substantially supplanted the first type.

My improved product is intended to eliminate the disadvantages which were inherent in both the types of material heretofore discussed. Specifically, I have provided a material which has an attractive appearance and which lends itself to artistic design and color and which will retain its attractive, decorative appearance notwithstanding exposure.

I take a loosely woven fabric material, the yarns of which may be conspicuously colored and of relatively large size. The decorative color scheme and pattern may be arranged according to choice. This material I shall hereinafter term "scrim". It is preferable to have the yarns of the scrim of different colors, though the color effect may be attained by printing a decorative design on the fabric or by printing a decorative design on the completed material itself. It is my intention, however, to employ fabric wherein the yarns have been previously colored and wherein the design is determined by the weave.

In the drawings this material is indicated as 10. I press or flow a plastic compound, such as rubber, though other compounds might be employed, over one surface of this fabric material. In the drawings this plastic compound is indicated as 12. By passing the fabric and the plastic compound between calender rolls, indicated diagrammatically as 14 and 16, or other suitable mechanism, I cause the rubber compound to enter into the interstices of the fabric and to extend entirely therethrough. I propose not only to cause the rubber compound to extend entirely through the interstices of the fabric but to prevent the same from smearing or overflowing on the opposite side of the fabric. My intention is to cause the rubber compound to completely fill all the voids between the yarns of the fabric so as to present a smooth, substantially unbroken, impervious, finished surface on the material while at the same time prevent the compound from overflowing or smearing upon the opposite surface of the fabric so that the weave and color of the yarns which compose the fabric will be preserved.

To accomplish this end I prefer to employ in my improved process a collecting or stripping sheet of material which is passed through the calender rolls and overlies the fabric 10. This collecting or stripping sheet is indicated as 18. This sheet of material possesses such body that when the rubber compound is forced through the interstices of the fabric sheet 10 it enters the interstices of the sheet material 18 and is collected thereby. This piece of material 18 therefore is provided to collect all the excess of plastic compound which passes entirely through the fabric 10 as the material is passed between the calender rolls. The collecting sheet 18 is removed from the formed sheet of fabric and rubber compound after the same has passed through the calender rolls and is carried through a suitable bath of solvent to remove any of the plastic compound therefrom so that it can be re-used for the same purpose.

My improved material therefore, when completely formed, has a body portion which is formed by the rubber compound 12 and a fabric top portion formed by the fabric, but which fabric top portion is formed in a series of blocks as determined by the weave of the fabric. There is exposed the weave and color of the fabric along the top surfaces of the yarn only and in between the strands of yarn there is exposed the blocks of rubber compound extending therethrough terminating evenly therewith and which carry as a background of the material the normal color of the rubber itself.

The interconnection of the rubber compound with the fabric is such that each particular yarn is locked in place by the rubber and the compound completely fills the interstices of the fabric and terminates flush therewith so as to present a smooth and unbroken surface which does not have any crevices to collect dirt or other foul material and which may be readily washed. Notwithstanding this smooth unbroken character of the upper surface of the material, its decorative design is dominated by the color scheme and weave pattern of the fabric which is employed. As a result the material presents an attractive appearance and is highly serviceable and retains both its attractive appearance and serviceability, notwithstanding exposure to the elements and varying weather conditions.

In addition to its function of collecting the plastic compound which is forced through the fabric 10 and would overlie the same if not collected, the stripping sheet 18 impresses that part of the plastic compound 12 lying flush with the surface of fabric 10 with the imprint of the stripping sheet material, which may be twill, duck, et cetera. This produces an added attractiveness in the finished product which is difficult to define or illustrate, but which unquestionably exists.

What I claim:

1. That process of manufacturing sheet material of the class described comprising passing a sheet of loosely woven fabric material between calender rolls together with a layer of suitable rubber compound so that the rubber compound is forced through the interstices of the fabric under pressure to substantially completely fill the interstices and at the same time passing a sheet of material through the rolls juxtaposed over the fabric material to collect the rubber compound that is extruded completely through the interstices of the fabric material, and to pick the same up to prevent its smearing over the outer surfaces of the fabric material.

2. That process of manufacturing sheet material of the class described comprising passing a sheet of loosely woven fabric material between calender rolls together with a layer of suitable rubber compound so that the rubber compound is forced through the interstices of the fabric under pressure to substantially completely fill the interstices and at the same time passing a foraminous sheet of material through the rolls overlying the fabric material, said foraminous sheet being adapted to integrate the rubber compound which is extruded through the interstices of the fabric material and prevent the same from flowing over or smearing the upper surface of said fabric material.

3. That process of manufacturing material of the character described comprising providing a loosely woven decorative fabric, forcing a waterproof plastic compound through the interstices of the loosely woven fabric from one side under pressure and against pressure taking means bearing upon the opposite side of the fabric having a surface engaging the fabric which provides a multiplicity of closely arranged depressions which permit the compound forced into the interstices of the fabric to collect without smearing over the surface of the fabric so as to completely fill said interstices substantially flush with the surface of the fabric.

4. That process of manufacturing material of the character described comprising providing a loosely woven decorative fabric, forcing a rubber compound through the interstices of the loosely woven fabric from the one side under pressure and against a pressure member having a reticulated surface bearing against the fabric wherein the rubber collects without spreading and smearing over the surface of the fabric and completely fills said interstices.

ALFRED J. SMITH.